United States Patent [19]

Koshimaru et al.

[11] 4,287,747
[45] Sep. 8, 1981

[54] PROCESS OF CLOSED EXTRUSION SHAPING OF A METAL ROD MATERIAL AND AN APPARATUS THEREFOR

[75] Inventors: Hajime Koshimaru, Machida; Shohju Ishii, Tokyo, both of Japan

[73] Assignee: Nissan Motor Co., Ltd., Yokohama, Japan

[21] Appl. No.: 57,850

[22] Filed: Jul. 16, 1979

[30] Foreign Application Priority Data

Jul. 18, 1978 [JP] Japan .................................. 53-86714
Jul. 18, 1978 [JP] Japan .................................. 53-86715

[51] Int. Cl.³ ............................................ B21D 22/00
[52] U.S. Cl. .................................................... 72/358
[58] Field of Search ................... 72/358, 354, 356, 360, 72/359, 352

[56] References Cited

U.S. PATENT DOCUMENTS

| 3,759,080 | 9/1973 | Sugahara | 72/356 |
| 3,893,325 | 7/1975 | Sato | 72/354 |
| 4,008,599 | 2/1977 | Dohmann | 72/358 |
| 4,068,518 | 1/1978 | Dockerill | 72/354 |

FOREIGN PATENT DOCUMENTS

| 42-12157 | 7/1967 | Japan . |
| 43-30038 | 12/1968 | Japan . |
| 49-86250 | 8/1974 | Japan . |
| 53-3959 | 1/1978 | Japan . |
| 1474876 | 5/1977 | United Kingdom . |

Primary Examiner—Nicholas P. Godici
Assistant Examiner—Gene P. Crosby
Attorney, Agent, or Firm—Thompson, Birch, Gauthier & Samuels

[57] ABSTRACT

Metal parts having yokes with two or more body portions, used for example for universal joints for automobiles, are manufactured by pressing a solid metal rod material from one end into a chamber formed by two opposing dies, the other end of the rod being urged against an impression formed in one of the dies to divide the rod material into two or more body portions, and extruding the divided body portions into cavities in the one die extending parallel to the pressing direction.

7 Claims, 27 Drawing Figures

FIG_11A   FIG_11B   FIG_11C
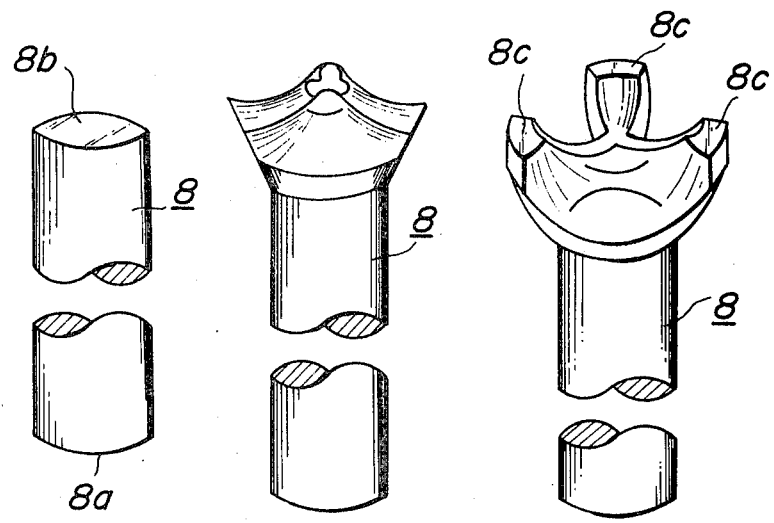
FIG_11D
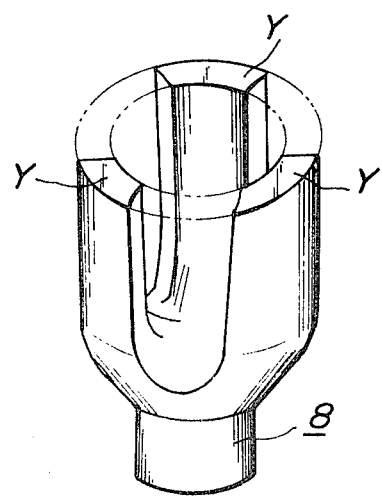

PROCESS OF CLOSED EXTRUSION SHAPING OF A METAL ROD MATERIAL AND AN APPARATUS THEREFOR

The present invention relates to a process and apparatus for manufacturing parts having yokes with two or more body portions from metal rods.

In the past, parts having yokes with two body portions, such as the sleeve yokes of automobile universal joints, have been manufactured in the manner shown in FIGS. 1A–1C. More particularly, as shown in FIG. 1A, two axially aligned parts with their yokes in opposed relationship are first produced in a rough state as a single forging. As shown in FIG. 1B, the parts are then separated and trimmed. Thereafter, the trimmed parts are machined, for example by grinding, to remove fins and the like and to produce the finished parts shown in FIG. 1C.

Parts having yokes with three body portions, such as the head portion (generally referred to as a "tulip") of a drive shaft for a universal joint in a front-engine front wheel drive car, generally have been manufactured by initially forging a rough shape of the type shown in either FIG. 2A or FIG. 2B. Thereafter these rough shapes are machined to produce the finished part shown in FIG. 2C.

In these conventional processes, there is a considerable loss of material due to the removal of fins, and many manufacturing steps are required in order to arrive at a finished product. Furthermore, when forging inclined surfaces of the type shown at a in FIG. 3A, conventional dies are subjected to high stresses, which in turn result in tool breakage. To avoid this problem, the parts are often forged with material remaining as at b in FIG. 3B. This material is then removed by extensive time consuming and expensive machinery. Another drawback with these conventional operations is that high loads are applied to the dies. This shortens the useful life of the tools, and thus adds considerably to production costs.

The present invention obviates these drawbacks by providing an improved process and apparatus for manufacturing parts having yokes with two or more body portions. The process of the present invention subjects solid rod material to a one step closed extrusion shaping operation without expensive loss of material.

These and other objects and advantages of the present invention will now be explained in greater detail with reference to the accompanying drawings, wherein:

FIG. 3A is a perspective view, partially in section, of a finished part of the type produced in accordance with the present invention;

Figures 10A, 10B, 10C:
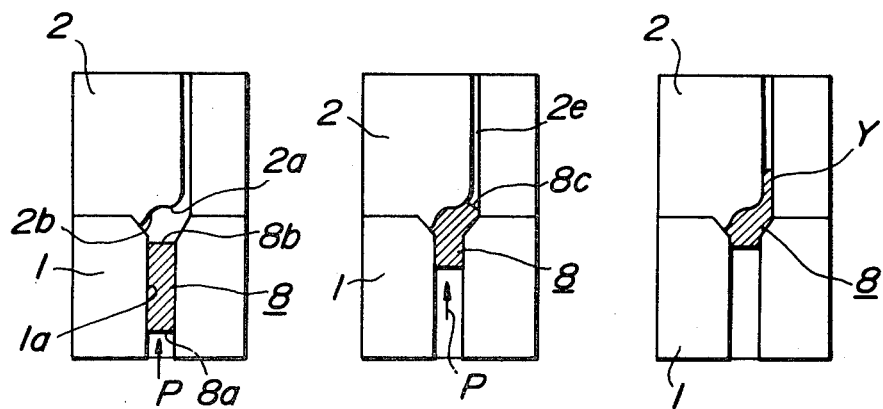
Figure 12:
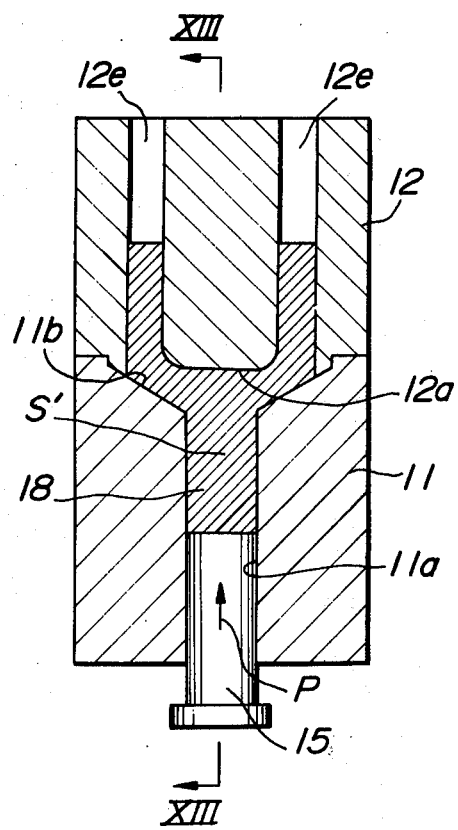
Figure 13:
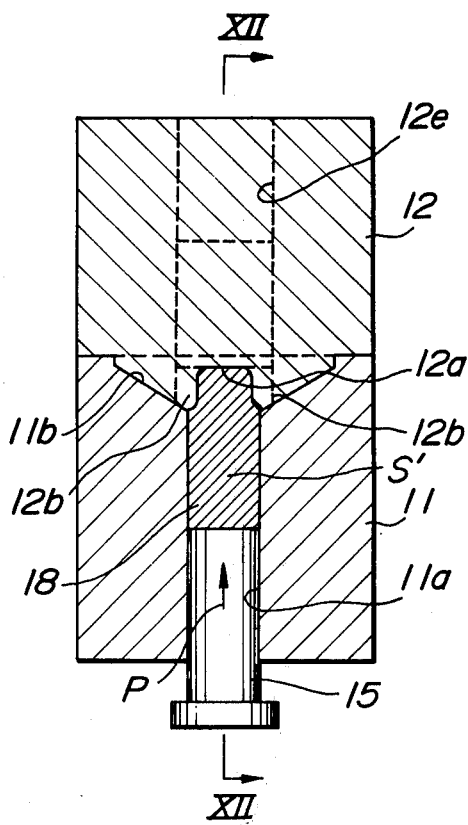
Figure 14:
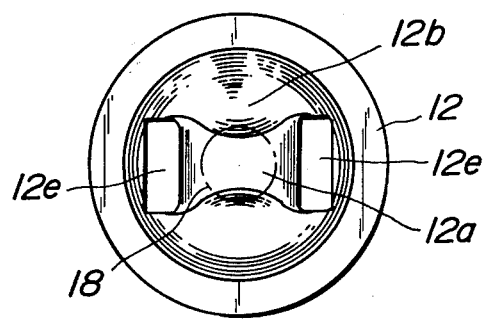
Figure 15:
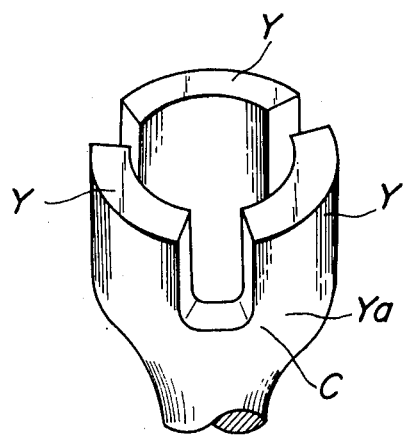
Figure 16:
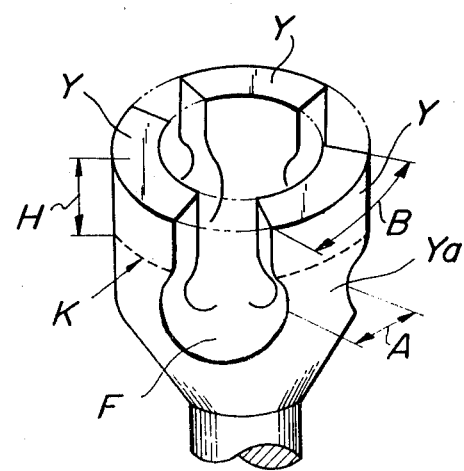
Figure 17:
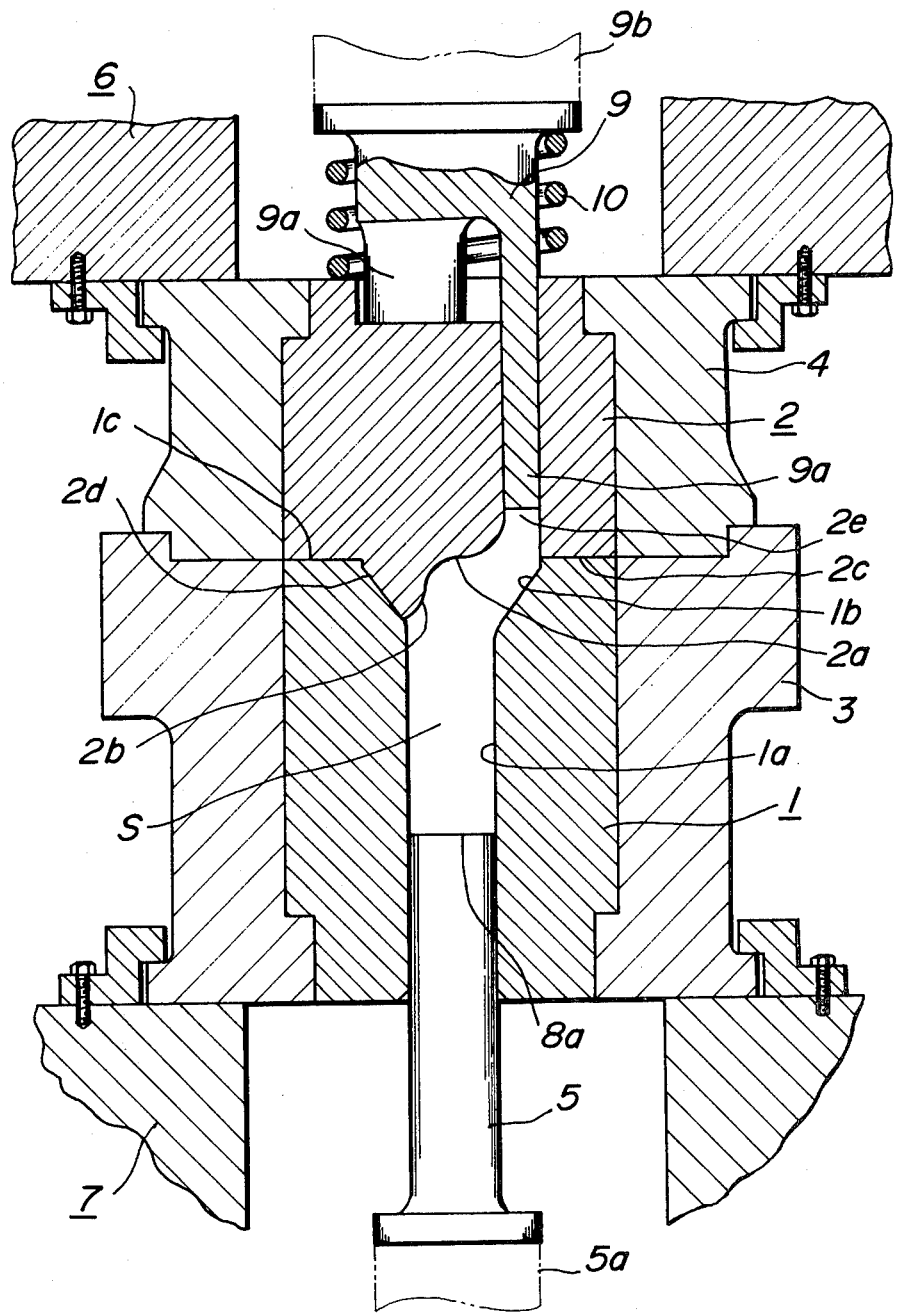

FIGS. 10 (A), (B) and (C) are views explaining the steps for shaping the part;

FIGS. 11 (A), (B), (C) and (D) are perspective views showing the appearence of the part at successive stages during its formation;

FIGS. 12–14 are views showing a second embodiment of the present invention, with FIG. 12 being a vertical sectional view taken along the line XII—XII in FIG. 13, FIG. 13 being a vertical sectional view taken along the line XIII—XIII in FIG. 12 and FIG. 14 being a bottom plan view of an upper die 12 in FIG. 12;

FIG. 15 is a perspective view of a part obtained by the conventional forging process;

FIG. 16 is a perspective view of the part of the third embodiment of the present invention; and FIG. 17 is a vertical sectional view of the other shaping apparatus embodiment of the present invention when the upper die is in contact with the lower die.

The invention will now be described with reference to the shaping of a part having three body portions, which is referred to as "tulip" as mentioned above.

Figure 3B:
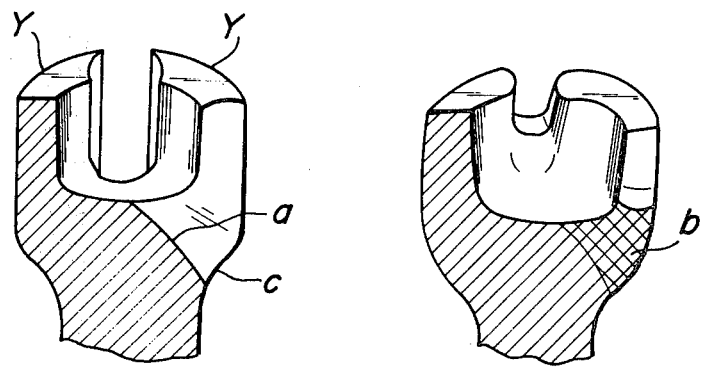
FIG. 3B is a perspective view, partially in section, of a rough shape formed by a conventional hot forging operation.
Figure 4:
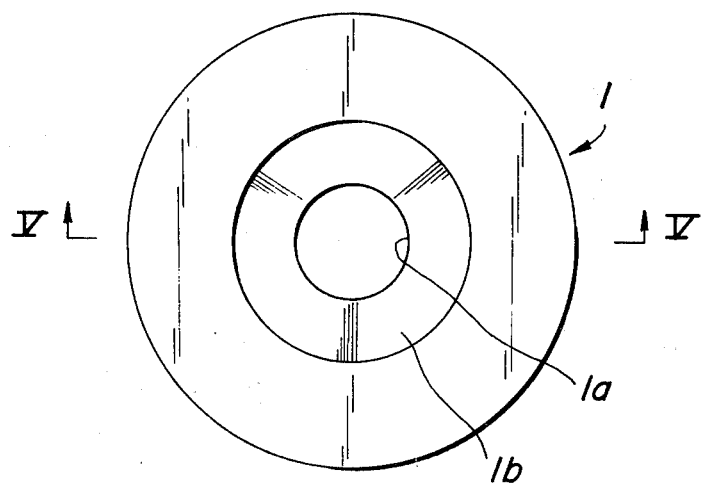
FIG. 4 is a plan view of the lower die to be used in the present invention.
Figure 5:
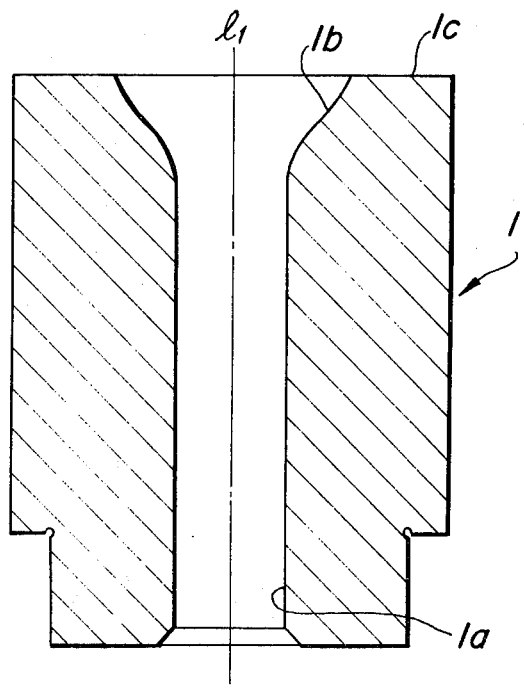
FIG. 5 is a vertical sectional view taken along the line V—V in FIG. 4.

The apparatus in this example is constructed with two dies which are separated into an upper die and a lower die or a left die and a right die. FIG. 4 and FIG. 5 are a plan view of one die (the lower die 1 fixed on the bolster side in this example) among the two dies and a vertical sectional view taken along the line V—V in FIG. 4 respectively. As shown in FIG. 5, the lower die is columnar and is provided with a guide hole $1a$ for guiding the solid rod which is a material for shaping the part, at the center portion, and said guide hole $1a$ is provided by perforating said die along the axial line $l_1$. At the upper end portion of this guide hole $1a$, a conical surface $1b$ (concave surface) opposing to a conical surface c (convex surface) shown in FIG. 3 (A) is formed. The upper end surface $1c$ forms a contact surface with another die (in this example, an upper die 2 capable of being moved by motion of a ram fixed to the ram side).

Figure 6:
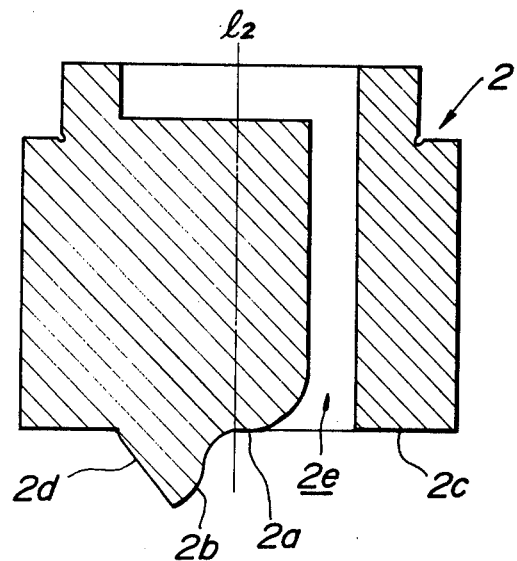
FIG. 6 is a vertical sectional view of the upper die to be used in the present invention, which is taken along the line VI—VI in FIG. 7.
Figure 7:
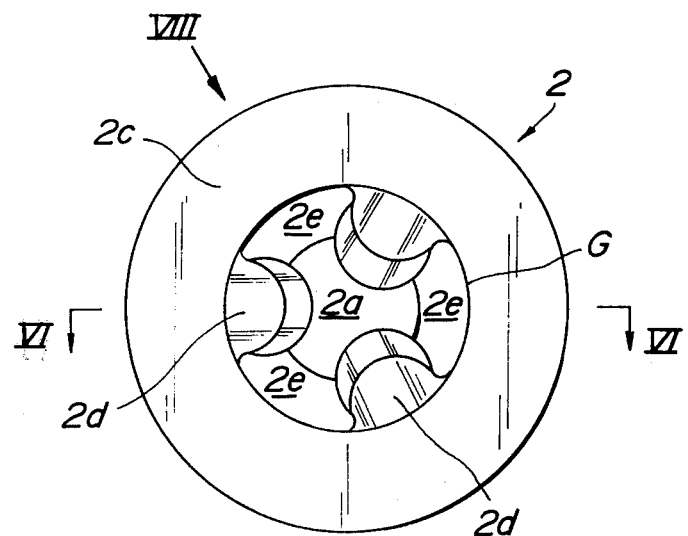
FIG. 7 is a bottom plan view of the upper die.

On the other hand, FIG. 6 and FIG. 7 are a vertical sectional view and a bottom plan view of the upper die 2 respectively. It will be seen from these views that the upper die 2 is provided with three projected portions $2b$ which abut against the top portion of a rod material and divide the top portion into three bodies when the rod material is pushed up along the guide hole $1a$. Each projected portion $2b$ projects from the surface $2c$, which contacts to the lower die 1, in order to form a slope surface a of the part shown in FIG. 3 (A). The outer surface $2d$ of each projected portion $2b$ is formed in the same conical shape (convex surface) as the conical surface $1b$ (concave surface) of the lower die in FIG. 5. Accordingly, the conical surface $1b$ of the lower die 1 contacts the outer circumferential surface of the projected portion $2b$ of the upper die 2 and backs up the outer circumferential surface $2d$. $2a$ is an end surface positioned at the center of the inside of the three projected portions $2b$ and this end surface $2a$ and the inside of the projected portions $2b$ form an impression.

Figure 8:
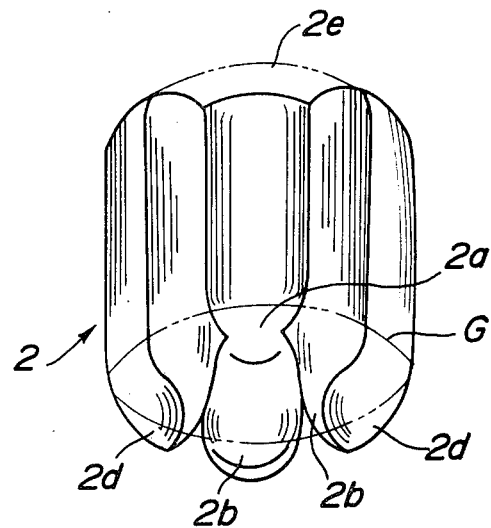
FIG. 8 is a perspective view as viewed in the direction of the arrow VIII in FIG. 7, showing that portion of the upper die circumscribed by the line G.

In the upper die 2, cavities $2e$ extending parallel to the axial line $l_2$ are provided at equal angle intervals at three positions around the axial line $l_2$ in order to extrude the rod material divided by the projected portions 2b and the end surface 2a into the pressing direction as mentioned hereinafter. The cross-sectional shape of each cavity 2e is a sector and is the same as the cross-sectional shape of the body portion Y in the part shown in FIG. 3 (A). FIG. 8 shows only the inside portion of the line G of the upper die 2 in FIG. 7 as the perspective view.

Figure 9:
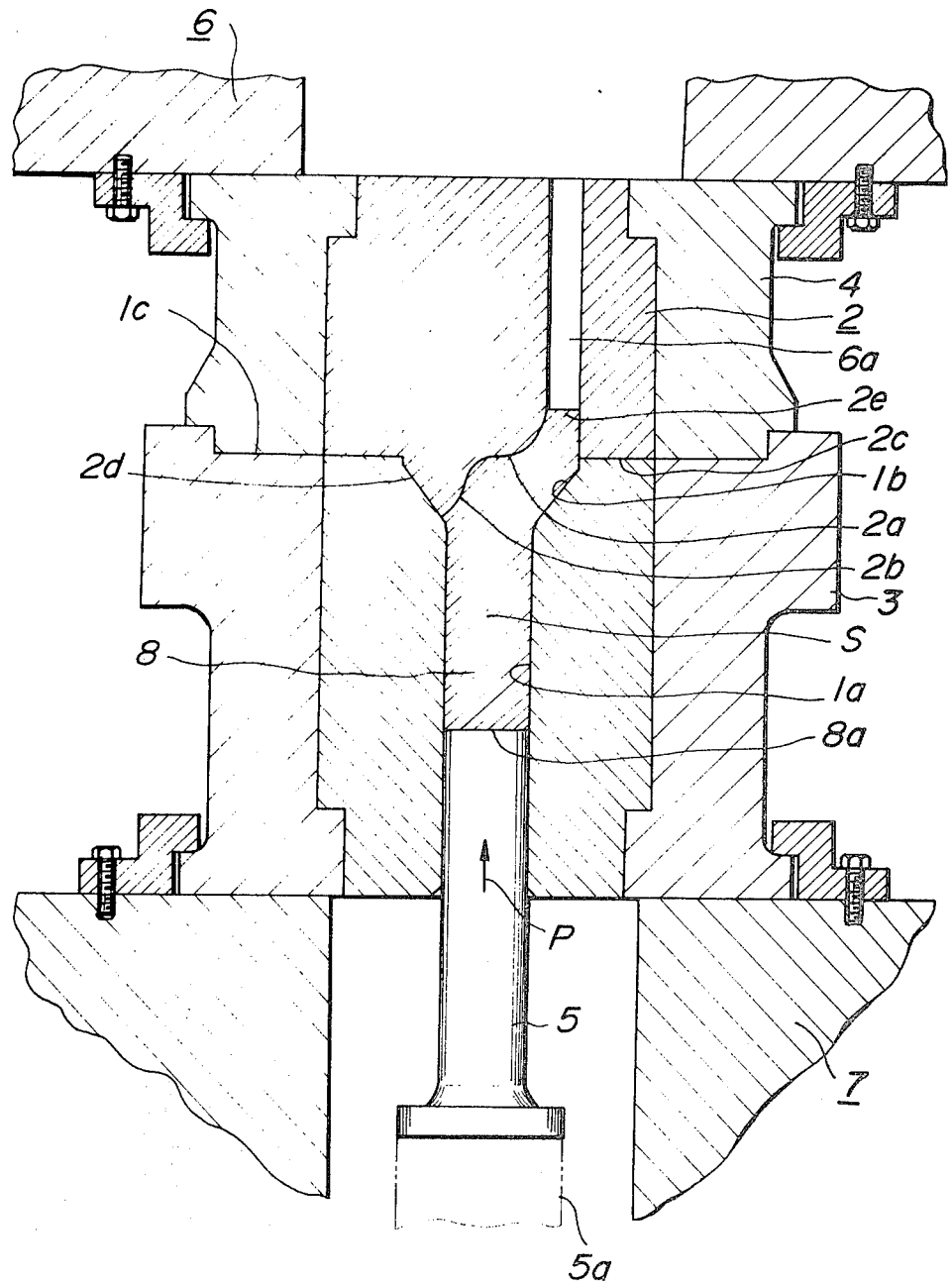
FIG. 9 is a vertical sectional view of the shaping apparatus showing the state when the upper die contacts the lower die.

The thus formed lower die 1 and upper die 2 are fitted respectively in the back up members 3 and 4 by thermal shrinkage as shown in FIG. 9. When the shaping is carried out, firstly by lowering the upper die 2, the contact surfaces 1c and 2c are brought together so that the axial lines $l_1$ and $l_2$ in FIGS. 5 and 6 align, and are pressed in upward and downward directions and maintained in such a state to form a chamber S. The numeral 5 is a punch, which slides in the guide hole 1a of the lower die 1 in the perforating direction and presses the solid rod material inserted in the guide hole 1a from one end, the numeral 6 is a ram, and the numeral 7 is a bolster. The punch 5 is pressed by a pressing means not shown, for example by a rod 5a of a hydraulic cylinder.

An explanation now will be made of the process for operating the above-described apparatus.

Firstly, the upper die 2 is moved upwardly and the dies are opened, and then a solid rod material 8 is inserted into the chamber S in FIG. 9 as shown in FIG. 10 (A), after which the upper die 2 is moved downwardly to close the dies and both the dies are pressed and held in the upward and downward directions under pressure of about 400 tons. Then, a cylinder not shown is driven to press one end 8a of the rod material by means of the punch 5 in the arrow direction P and the rod material is pushed along the guide hole 1a. The other end 8b of the rod material 8 is urged to the projected portion 2b of the upper die 2 as shown in FIG. 10 (B), whereby the top portion of the rod material 8 is divided in three directions. The shape of the rod material 8 in this stage is shown in FIG. 11 (B). By further pressing the rod material in the arrow direction P in FIG. 10 (B), the divided rod 8 is extruded into the cavities 2e in the upper die 2 and formed into the intermediate shape as shown in FIG. 11 (C) and by further pressing, into the finally shaped product as shown in FIG. 11 (D). After having finished the shaping, the part is taken out by opening the lower die 1 and the upper die 2. For example, when chromium-molybdenum steel (SCM22H) having a diameter of 32 mm and a length of 95 mm is used, the pressure applied to the rod material by the punch 5 is preferred to be about 120 tons.

Furthermore, in the above described example, the outer surface 2d of the projected portion 2b of the upper die 2 abuts on the conical surface 1b of the lower die 1 tightly and is backed up with the lower die 1, so that there is no danger that the projected portion 2b will be broken owing to generation of an excessive stress concentration and the durable life of the dies is prolonged extremely.

Figures 1A, 1B, 1C:
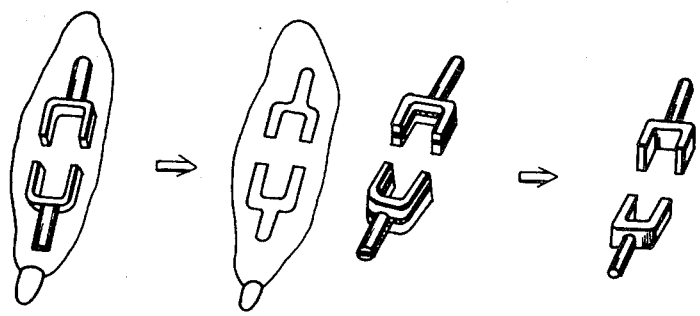
FIGS. 1A–1C illustrate a conventional process for producing parts having yokes with two body portions.
Figures 2A, 2B, 2C:
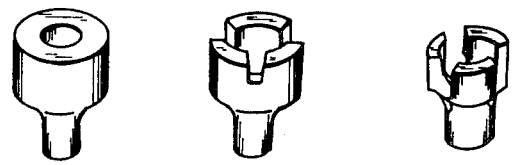
FIGS. 2A–2C illustrate another conventional process for producing parts having yokes with three body portions.

A second embodiment of the present invention will now be described with reference to FIGS. 12, 13 and 14. In this case, a part having a yoke with two body portions such as the sleeve yoke of universal joint shown in FIG. 1 is being shaped. A closed cavity S' is formed by forcedly contacting a lower die 11 provided with a guide hole 11a to an upper die 12 provided with two projected portions 12b for branching, which oppose to the lower die 11, and two cavities 12e and 12e extending parallel to the pressing direction.

In the same manner as in the above described example, a solid rod material is inserted in a guide hole 11a of the lower die 11 and the lower end of the rod material is pressed by a punch 15 in the arrow direction P and the upper end of the rod material is divided into two body portions and then extruded into the cavities 12e and 12e, whereby the shaping of the yoke is completed. In FIGS. 12, 13 and 14, the numeral 18 shows the shaped product.

Furthermore, the inventors have found that a part with a yoke having two or more body portions wherein the width in the transverse direction at the root portion of each body portion is smaller than the width in the transverse direction at the center portion or the upper end portion of the body portion as shown in FIG. 16 can be shaped by the closed extrusion shaping process as described hereinafter.

It is difficult to directly form the yoke by the usual forging in the case of the shape where the width in the transverse direction at the root portion of the body portions Y is smaller than the width of the center portion or the upper end portion as shown in FIG. 16. After a metal material is forged into the form wherein an excessive thickness C is provided at the root portion Ya as shown in FIG. 15, the forged body is subjected to a machining, such as cutting to obtain the finished article as shown in FIG. 16. Accordingly, many steps are needed and the yield of the material is low, so that the production cost becomes very high.

The second aspect of the present invention has been made for overcoming the above described defect and consists in a process for manufacturing parts having yokes with a plurality of body portions from a rod material by closed extrusion shaping and an apparatus therefor, wherein a solid rod material is pressed from one end in a chamber formed by two mutually opposed dies, said dies being contacted with each other at the end face of both the dies at the position which corresponds to the broken line K in FIG. 16 or is above said broken line K, and another end is urged to the impression formed by the upper die to divide the rod material into two or more (in the case of the above described part: 3) body portions, the divided body portions are extruded into cavities parallel to the pressing direction, a back pressure is applied to each top end surface of the extruded body portions to fill the chamber including the above described impression, or after filling, the divided body portions are extruded, or the divided body portions are extruded while applying the back pressure, whereby a part having a yoke with a plurality of body portions as shown in FIG. 16 is shaped in one step without loss of material.

The term "back pressure" used herein means the load applying to the top end of the plurality of divided body portions in the opposite direction to the direction for extruding the rod material.

An explanation now will be made with respect to an example for manufacturing the part, that is the head portion of a drive shaft for tri-port type constant velocity universal joint in a front-engine, front-drive car as shown in FIG. 16.

The dies in this embodiment are shown in FIG. 17 and composed of the same upper die 2 and lower die 1 as shown in the above described FIGS. 4–7.

The lower die 1 and the upper die 2 are fitted in the back up members 3 and 4 by means of thermal shrinkage and the contact surfaces 1c and 2c are brought together so that the axial lines $l_1$ and $l_2$ in FIGS. 5 and 6 align and both the dies are forced in the upward and downward directions by a pressing apparatus (not shown in the drawing) under a force of about 400 tons and the chamber S is formed. The numeral 5 is the punch which slides in the guide hole 1a of the lower die 1 in the perforating direction and presses the inserted solid rod material 8 from one end of said rod, the numeral 9 is a counter punch, which has three divided portions 9a sliding in each cavity 2e and applies back pressure which presses each top end surface of the divided rod material extruded in the cavities 2e, and the numeral 10 is a return spring provided between the counter punch 9 and the upper die 2. The punch 5 and the counter punch 9 are pressed by push rods 5a and 9b of the pressing apparatus such as hydraulic pressure apparatus not shown in the drawing.

The numeral 6 is the ram, by which the upper die 2 is fixed and the numeral 7 is the bolster by which the lower die 1 is fixed.

An explanation will be made with respect the process for shaping the part shown in FIG. 16 by using the apparatus as shown in FIG. 17.

Firstly, the upper die 2 is moved upwardly and the dies are opened, and then a solid rod material 8 is inserted into the chamber S in FIG. 17 as shown in FIG. 10 (A), after which the upper die 2 is moved downwardly to close the dies and both the dies are pressed and held in the upward and downward directions under pressure of about 400 tons. Then, a cylinder not shown is driven to press one end 8a of the rod material through the punch 5 in the arrow direction P and the rod material is pushed along the guide hole 1a. The other end 8b of the rod material 8 is urged to the projected portion 2b of the upper die 2 as shown in FIG. 10 (B), whereby the top portion of the rod material 8 is divided in three directions. The shape of the rod material 8 in this stage is shown in FIG. 11 (B).

In this case, since the upper die and the lower die are previously contacted forcedly with each other and the projected portion 2b of the upper die 2 is strongly backed up with the conical surface 1b of the lower die 1, the generation of excessive stress concentration to be caused at the projected portion 2b upon shaping and the breakage of the projected portion 2b resulting from the generation of excessive stress concentration can be prevented.

Then, the solid rod 8 is pressed in the arrow P direction as shown in FIG. 10 (B), whereby the divided rod material 8 is extruded into the cavities 2e of the upper die 2 and formed into the shape as shown in FIG. 11 (C). At this time, each top end surface 8c of the divided rod materials 8 contacts to the top end surface of the branched portion 9a of the counter punch 9 and the counter punch is stationarily maintained at the given position until the back pressure of about 40–50 tons is applied and the chamber S in FIG. 17 is filled with the solid rod material 8. That is, the rod material is pushed into the cavities 2e against the ends of the branched counter punch portions 9a. The counter punch remains fixed relative to the dies until rod material bulges within the cavities 2e to provide the breadth relationship shown at "A" and "B" in FIG. 16. Thereafter, the counter punch 9 is moved backward while maintaining the necessary back pressure and the rod material 8 divided in the cavities 2e parallel to the pressing direction P is extruded until the body portions Y having the given length as shown in FIG. 10 (C) are formed, whereby the part having the final shape as shown in FIG. 11 (E) is formed, after which the lower die 1 and the upper die 2 are separated and the part is taken out.

When the length (dimension H in FIG. 16) of the body portion is short, it is possible to omit the extrusion step after the above described upsetting step. Even when the length of the yoke is relatively long, if the difference of the breadth of the root portion of the body portion in the lateral direction from the breadth of the top end portion or the center portion of the body portion in the lateral direction is small, after the above described upsetting step, the body portions may be extruded only by the pressure of the punch 5 until the body portions reach the given length.

However, in any case, it is preferable to set the top end (lower end in FIG. 17) of the counter punch 9 at the position somewhat above the contact surface 1c and 2c of the lower die 1 and the upper die 2 at the original stage of the shaping. When the top end of the counter punch is set at the position too far from the contact surface, the rod material buckles in the upsetting step.

As mentioned above, in the apparatus as shown in FIG. 17, which is provided with the counter punch 9, the shape of the body portions as shown in FIG. 16, wherein the breadth of the center portion and the top end portion of the body portions Y is larger than the breadth of the root portion Ya, is formed due to the back pressure of the counter punch. While in the apparatus provided with no counter punch as shown in FIG. 9, the formed part has the shape as shown in FIG. 11 (D), wherein the breadth of the center portion and the top end portion of the body portions Y is equal to the breadth of the root portion thereof.

The experimental results when as the rod material, use is made of chromium-molybdenum steel (SCM22H) having a diameter of 32 mm and a length of 95 mm and the shaping temperature is 600° C., are shown in the following table.

In this table, "B" shows the breadth at the top end portion or the center portion of the body portions Y, "H" shows the length of the portion having the breadth B, "$P_1$" shows the load of the punch 5 and "$P_2$" shows the load of the counter punch 9. The stages 1–7 show the shaping stages. That is, during the stages 1–5, the body portion is upset and the size B increases and at that time, $P_1$ is 188 tons and $P_2$ is 90 tons. During the stages 6 and 7, the size B does not increase and only the size H increases.

TABLE

| Stage | B (mm) | H (mm) | $P_1$ (ton) | $P_2$ (ton) |
| --- | --- | --- | --- | --- |
| 1 | 21 | 7.5 | 70 | 0 |
| 2 | 27 | 16 | 120 | 42 |
| 3 | 27 | 21.8 | 125 | 43 |
| 4 | 34 | 22.3 | 140 | 65 |
| 5 | 35.5 | 22 | 188 | 90 |
| 6 | 35.5 | 32 | 215 | 43 |
| 7 | 35.5 | 37.2 | 215 | 50 |

In this case, $P_1$ increases from 188 tons to 215 tons but $P_2$ decreases from 90 tons to 40–50 tons.

According to the second aspect of the present invention, the part having the shape as shown in FIG. 16 can be shaped in one extrusion working step and the upsetting having a large upset ratio (expanding ratio of the cross-sectional area of the divided body portions in the extrusion direction) can be effected. Furthermore, since the shaping is conducted in the closed cavity formed by two stationary dies, good production accuracy is obtained and the finishing working by mechanical working can be substantially omitted and there is substantially no loss in the material.

Furthermore, the loads to the upper die and lower die and the punch are relatively more stationarily applied than the conventional working process and the durable life can be noticeably improved. In particular, in the case of the above described examples, the outer surface 2d of the projected portion 2b of the upper die 2 tightly contacts and is backed up with the conical surface 1b of the lower die 1, so that there is no fear of breakabe of the projected portion 2b.

Accordingly, the production cost of the part is considerably lowered.

I claim:

1. A process for manufacturing parts having yokes with two or more body portions from a metal solid rod material by extrusion shaping, which comprises pressing a solid metal rod material from one end into a chamber formed by two opposing dies, with the other end of the rod being urged into contact with an impression and associated projecting portions formed in one of said dies to divide the rod material into two or more body portions which are then extruded into cavities which are in communication with said chamber and which extend in the said one die parallel to the pressing direction.

2. A process for manufacturing parts having yokes with two or more body portions wherein the breadth of the root portion of each body portion in the transverse direction is smaller than the breadth of the center portion or the top end portion of each body portion in the transverse direction, from a metal solid rod material by extrusion shaping which comprises pressing a solid metal rod material from one end into a chamber formed by two opposing dies, with the other end of the rod being urged into contact with an impression and associated projecting portions formed in one of said dies to divide the rod material into two or more body portions which are then extruded into cavities in said one die communicating with said chamber and extending parallel to the pressing direction, and applying back pressure to the top end surface of each body portion to fill the chamber including said impression with the extruder material.

3. The process as claimed in claim 2, wherein after filling the chamber including the impression with the extruded material, continuing to extrude the body portions in the direction parallel to the pressing direction until the body portions reach a given length.

4. The process as claimed in claim 3, wherein the top end surfaces of the body portions are subjected to a back pressure while being extruded into said cavities.

5. An apparatus for shaping a metal solid rod material into parts having yokes with two or more body portions by closed extrusion, which comprises two opposing dies forming a chamber and a punch pressing the metal solid rod material into said chamber from one end, one of said two dies being provided with a guide hole for guiding the rod material, said guide hole extending through said one die in the perpendicular direction to the contact surface of said dies, and the other of said dies being provided with an impression and projecting portions opposed to said guide hole, which contact the top end portion of said rod material and divide said rod material into two or more body portions, and a plurality of cavities in said other die for receiving and guiding the divided rod material in the direction parallel to said guide hole, said punch being axially movable in the guide hole.

6. The apparatus as claimed in claim 5, wherein the projecting portions projects beyond the contact outerface between said dies and one die has a back up surface capable of abutting an outer surface of the projected portion.

7. The apparatus as claimed in claim 5, wherein a counter punch which is inserted into said cavities applies back pressure to each top end surface of the divided material extruded into said cavities.

* * * * *